Aug. 11, 1931.   N. WILLIAMS ET AL   1,818,775

WINDSHIELD WIPER

Filed April 19, 1930

Inventors
N H Williams
H Mittermeier
by J Edw Maybee
ATTY

Patented Aug. 11, 1931

1,818,775

UNITED STATES PATENT OFFICE

NORMAN WILLIAMS AND HERMAN MITTERMEIER, OF KITCHENER, ONTARIO, CANADA

WINDSHIELD WIPER

Application filed April 19, 1930. Serial No. 445,601.

This invention relates to windshield wipers of the type in which a piston, or pistons, reciprocating in a cylinder, or cylinders, are directly connected by flexible connections with a wiper guided for movement parallel to the cylinders. In the form shown in our United States Patent #1,725,436 of August 20th, 1929 two cylinders and pistons are employed, one for operating the wiper in one direction and the other for operating it in the reverse direction. In another known form one cylinder is employed, but the flexible connections pass through axially positioned stuffing boxes in the cylinder ends which are hard to keep tight owing to the extensive and long continued rectilinear travel of the connections. Our object therefore is to devise a wiper employing only one cylinder in which the flexible connections to the wiper are not required to pass through stuffing boxes and in which the travel of the piston need not be co-extensive with that of the wiper.

We attain our object by means of a construction which may be briefly described as follows. A piston reciprocable in a closed cylinder has flexible connectors secured thereto, one at each end. Journalled in each end of the cylinder, at right angles to its axis, is a short spindle extending through a stuffing box in the wall of the cylinder. Each spindle has two drums secured thereto, one inside and one outside. The piston connectors are secured to and wrap around the inside drums. To a suitably guided wiper is secured one end of each of two flexible connectors, the other ends of which are secured to and wrap around the outside drums. Suitable passages, conduits and a wiper operated valve are provided whereby opposite ends of the cylinder may be alternately put into communication with the atmosphere and a source of suction.

Figure 1:
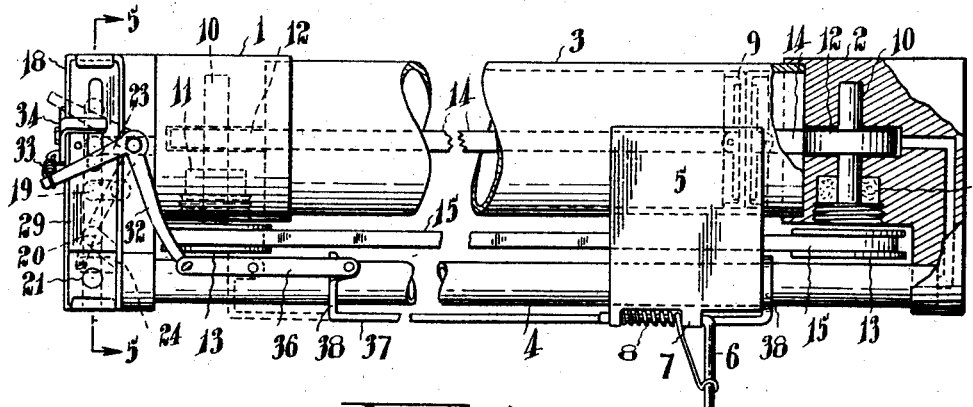
Figure 2:
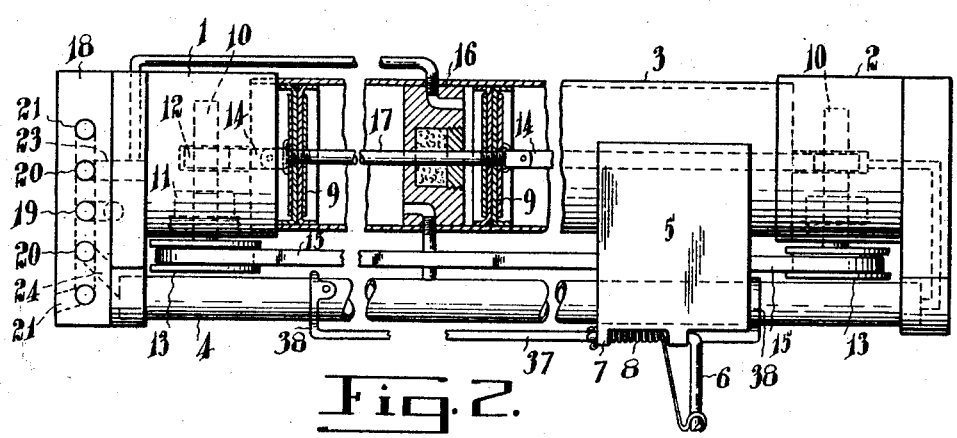
Figures 3, 4, 5:
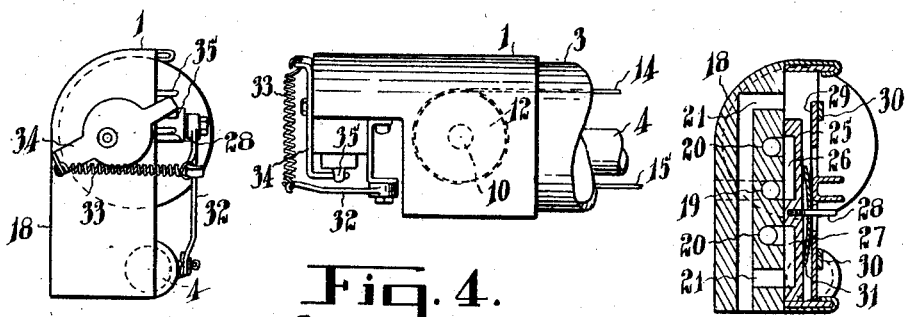

The whole is constructed substantially as hereinafter more specifically described and as illustrated in the accompanying drawings in which Fig. 1 is a rear elevation, partly in section, of a wiper constructed in accordance with our invention;

Fig. 2 is a similar view of parts of the same showing a modification;

Fig. 3 an end elevation of the valve;

Fig. 4 a vertical transverse section of the same; and

Fig. 5 a sectional elevation on the line 5—5 in Fig. 1.

In the drawings like numerals of reference indicate corresponding parts in the different figures.

The device is supported by means of two brackets 1 and 2, which are, when the device is in use, suitably secured to the vehicle above the windshield. These brackets receive the ends of the cylinder 3, parallel to which is supported the tube 4. This tube and the cylinder serve as a guide for the wiper carrier 5 on which is hinged the wiper arm 6 by means of a journal 7. A coil spring 8 positioned on the journal engages the wiper carrier and the wiper arm and tends to hold the wiper, not shown, in engagement with the windshield. Within the cylinder a piston 9 is adapted to reciprocate. Journalled at each end of the cylinder is a spindle 10 extending through the wall of the cylinder at right angles to the axis thereof. The bearing of each spindle is provided with a stuffing box 11 to prevent air leakage around the spindle. Within the cylinder a drum 12 is secured to each spindle, while to the outer end of each spindle is affixed a drum 13.

Secured to opposite sides of the piston are the flexible connectors 14. Each connector is secured at its other end to, and is wrapped on, one of the inside drums 12. Similar connectors 15 connect the wiper carrier 5 and the outside drums 13. From this construction it follows that by reciprocating the piston corresponding reciprocating movement is imparted to the wiper carrier. As the drums 12 and 13 may be made of different diameters any desired ratio may be obtained between the stroke of the piston and the stroke of the windshield wiper.

In the modification shown in Fig. 2 the cylinder is formed with a central partition 16 through which extends a piston rod 17 connecting two pistons 9, the two connectors 14 being connected respectively to the outer ends of the two pistons. A shorter piston stroke is thus obtained requiring a suitable proportioning of the inside drums to the outside drums to give the desired longer movement of the wiper carrier. At one end of the wiper is formed a valve chest 18 provided with the central port 19, the vacuum ports 20 and the atmospheric ports 21. The ports 20 are connected with opposite ends of the cylinder by the conduits 23 and 24, the tube 4 forming part of the latter conduit. The central port will be connected by a suitable conduit, not shown, with some source of suction, preferably the intake manifold of the engine of the vehicle. The valve chest is provided with a slide 25 provided with grooves 26, 27. It will be evident on reference to Fig. 5 that by moving the slide one cylinder end may be brought into communication with the port 19 and the other end of the cylinder with the atmosphere or vice versa.

The slide may be actuated in any suitable manner. We show it as actuated through the medium of a pin 28 which projects upwardly through the actuating slide 29. Held in place by the cross bars 30 a bent spring 31 engaging the valve slide 25 and the actuating slide 29 compresses the former closely into contact with the valve chest. The actuating slide 29 is operated through the medium of the bell crank lever 32 fulcrumed on the end bracket 1. One arm of this bell crank lever projects over the actuating slide 29 and is connected with one end of a coil spring 33, the other end of which is connected with the lower end of the actuating lever 34 fulcrumed on the valve chest and having its upper end bent over and positioned between shoulders 35 formed on the actuating slide 29. From this construction it follows that by suitably rocking the bell crank lever 32 the axis of the spring may be shifted to one side or the other of the actuating lever 34, thus providing a snap-over action which will ensure rapid movement of the valve slide 25 from one position to the other. The bell crank lever is actuated by means of a connecting rod 36 which is pivotally connected with the bell crank lever and one end of a shifter rod 37 mounted to slide longitudinally of the cylinder 3. This shifter rod is provided at opposite ends with the tappets 38, which preferably embraces the tube 4. The wiper, by alternately engaging these tappets, automatically shifts the valve at each end of its stroke as required.

From the above description it will be seen that we have devised a wiper which will satisfactorily operate with one cylinder only instead of two as in our United States Patent #1,725,436 and which dispenses with the necessity of carrying flexible connecting members axially through the ends of the cylinder.

What we claim as our invention is:

1. In a device for actuating a movable part, the combination of a cylinder, a piston rectilinearly-reciprocable therein; a spindle journalled at right angles to the axis of the cylinder and extending with a substantially air-tight fit through its wall; means connected to the piston for rotating the spindle; a movable part; and means actuated by the spindle for moving the said part.

2. In a device for actuating a movable part, the combination of a cylinder, a piston rectilinearly-reciprocable therein; a spindle journalled at right angles to the axis of the cylinder and extending with a substantially air-tight fit through its wall; means connected to the piston for rotating the spindle; a rectilinearly movable part; and means actuated by the spindle for moving the said part.

3. In a device for actuating a movable part, the combination of a cylinder, a piston rectilinearly-reciprocable therein; a spindle journalled at right angles to the axis of the cylinder and extending with a substantially air-tight fit through its wall; means connected to the piston for rotating the spindle; a rectilinearly movable part; and means actuated by the spindle for moving the said part at a rate different to that of the piston.

4. In a device for actuating a movable part, the combination of a cylinder, a piston rectilinearly-reciprocable therein; a spindle journalled at right angles to the axis of the cylinder and extending with a substantially air-tight fit through its wall; means connected to the piston for rotating the spindle; a rectilinearly movable part; and means actuated by the spindle for moving the said part comprising a drum fixed to the outer end of the spindle, and a flexible connector secured at one end to the said part and at its other end to the said drum.

5. In a device for actuating a movable part, the combination of a cylinder, a piston rectilinearly-reciprocable therein; a spindle journalled at right angles to the axis of the cylinder and extending with a substantially air-tight fit through its wall; means connected to the piston for rotating the spindle comprising a drum fixed to the inner end of the spindle, and a flexible member secured at one end to the piston and at its other end to the said drum.

6. In a device for actuating a movable part, the combination of a cylinder, a piston rectilinearly-reciprocable therein; a spindle journalled at right angles to the axis of the cylinder and extending with a substantially air-tight fit through its wall; means connected to the piston for rotating the spindle comprising a drum fixed to the inner end of the spindle, and a flexible member secured at one end to the piston and at its other end to the said drum; a rectilinearly movable part; and means actuated by the spindle for moving the said part comprising a drum fixed to the outer end of the spindle, and a flexible connector secured at one end to the said part and at its other end to the said drum.

7. In a device for actuating a movable part, the combination of two closed cylinders arranged end to end with a stuffing box between them; a piston in each cylinder; a piston rod connecting the pistons and passing through its stuffing box; spindles journalled at right angles to the axes of the cylinders, one at the outer end of each and extending with a substantially air-tight fit through its wall; means connected to each piston for rotating the adjacent spindle; a movable part; and means actuated by the spindles for moving the said part alternately in opposite directions when the pistons are reciprocated.

Signed at Kitchener, Ontario, this seventh day of April, 1930.

NORMAN WILLIAMS.
HERMAN MITTERMEIER.